United States Patent
Sankaralingam et al.

(10) Patent No.: US 10,963,384 B2
(45) Date of Patent: Mar. 30, 2021

(54) METHOD, COMPUTER PROGRAM PRODUCT, AND APPARATUS FOR ACCELERATION OF SIMULTANEOUS ACCESS TO SHARED DATA

(71) Applicant: SimpleMachines Inc., Madison, WI (US)

(72) Inventors: Karthikeyan Sankaralingam, Madison, WI (US); Vinay Gangadhar, Sunnyvale, CA (US); Anthony Nowatzki, Los Angeles, CA (US); Yunfeng Li, Redmond, WA (US)

(73) Assignee: SimpleMachines Inc., Madison, WI (US)

( * ) Notice: Subject to any disclaimer, the term of this patent is extended or adjusted under 35 U.S.C. 154(b) by 0 days.

(21) Appl. No.: 16/719,458

(22) Filed: Dec. 18, 2019

(65) Prior Publication Data

US 2020/0201690 A1    Jun. 25, 2020

Related U.S. Application Data

(60) Provisional application No. 62/781,644, filed on Dec. 19, 2018.

(51) Int. Cl.
*G06F 12/084* (2016.01)
*G06F 9/54* (2006.01)
(Continued)

(52) U.S. Cl.
CPC ............ *G06F 12/084* (2013.01); *G06F 9/321* (2013.01); *G06F 9/5077* (2013.01); *G06F 9/544* (2013.01); *G06F 2212/1021* (2013.01)

(58) Field of Classification Search
CPC ........ G06F 9/321; G06F 9/5077; G06F 9/544; G06F 12/084; G06F 2212/1021; G06F 12/0844
(Continued)

(56) References Cited

U.S. PATENT DOCUMENTS 8,452,835 B2 * 5/2013 Raja ...................... H04L 67/325
  709/203
9,146,747 B2 * 9/2015 Moloney ................... G06T 1/60
(Continued)

OTHER PUBLICATIONS

D. Lenoski et al., "Design of scalable shared-memory multiprocessors: the DASH approach," Digest of Papers Compcon Spring '90. Thirty-Fifth IEEE Computer Society International Conference on Intellectual Leverage, San Francisco, CA, USA, 1990, pp. 62-67. (Year: 1990).*

(Continued)

*Primary Examiner* — Reginald G Bragdon
*Assistant Examiner* — Aaron D Ho
(74) *Attorney, Agent, or Firm* — Moyles IP, LLC (57) ABSTRACT

A method for performing acceleration of simultaneous access to shared data may include providing a plurality of groups of cores and a plurality of shared memory structures, providing a pod comprising the plurality of groups of cores linked by a common broadcast channel, and coordinating each shared memory structure to provide a logically unified memory structure. Each memory structure may be associated with a group of cores, and each group of cores may include one or more cores. The common broadcast channel may be operatively coupled to each shared memory structure. The coordinating each shared memory structure may include identifying a simultaneous read-reuse load to a first shared memory structure, fetching data corresponding to the simultaneous read-reuse load, and forwarding the data to shared memory structures other than the first shared memory structure and to groups of cores other than a first group of cores via the broadcast channel.

18 Claims, 4 Drawing Sheets

(51) Int. Cl.
*G06F 9/32* (2018.01)
*G06F 9/50* (2006.01)

(58) Field of Classification Search
USPC .......................................................... 711/147
See application file for complete search history.

(56) References Cited

U.S. PATENT DOCUMENTS

| | | | |
|---|---|---|---|
| 9,910,675 B2* | 3/2018 | Barry | G06F 13/28 |
| 2005/0027941 A1* | 2/2005 | Wang | G06F 9/383 |
| | | | 711/121 |
| 2014/0089591 A1* | 3/2014 | Moir | G06F 9/50 |
| | | | 711/130 |
| 2016/0077970 A1* | 3/2016 | Liu | G06F 12/084 |
| | | | 711/121 |
| 2016/0232107 A1* | 8/2016 | Ros | G06F 12/1045 |
| 2019/0102303 A1* | 4/2019 | Wang | G06F 12/084 |

OTHER PUBLICATIONS

M. Musleh, V.S. Pai. "Automatic sharing classification and timely push for cache-coherent systems". In Proceedings of the International Conference for High Performance Computing, Networking, Storage and Analysis (SC '15). Association for Computing Machinery, New York, NY, USA, Article 13, 1-12. (Year: 2015).*

* cited by examiner

METHOD, COMPUTER PROGRAM PRODUCT, AND APPARATUS FOR ACCELERATION OF SIMULTANEOUS ACCESS TO SHARED DATA

CROSS-REFERENCE TO RELATED APPLICATIONS

This application claims the benefit of U.S. Provisional Patent Application No. 62/781,644 filed Dec. 19, 2018, the entire contents of which are incorporated herein by reference.

FIELD

The present disclosure relates generally to data processing and, more particularly, to methods and apparatuses for providing acceleration of memory access.

BACKGROUND OF THE DISCLOSURE

Achieving high data bandwidth from large caches is instrumental in providing high performance for many big-data and machine learning workloads. For many important workloads, including machine learning, it is often the case that data is read by many cores at roughly the same time, from some shared level of the memory hierarchy. This data access behavior pattern is very common in deep-learning workloads where a set of weights is accessed during an inference or "forward pass" phase. There are at least three sources of overhead for this type of structured access: 1) request bandwidth: all cores will place bandwidth demand for requests of data on the network which connects the private levels of the memory hierarchy to the shared level, 2) shared-memory bandwidth: the shared level of the memory hierarchy often cannot support enough bandwidth for all simultaneous requests, and 3) data bandwidth: the responses from the shared level, the data, will place significant bandwidth demand on the network. Due to the fact that these accesses are already naturally synchronized to some extent, there is a potential to exploit this simultaneous or contemporaneous access through a more efficient broadcast mechanism. Illustratively, this design consideration applies to any multiprocessor that targets workloads with significant amounts of read reuse, as well as network-on-chip (NoC) designs with high bandwidth approaching the maximum cache width. These designs may include central processing unit (CPU) and general processing unit (GPU) architectures.

A number of techniques for handling the high bandwidth demands of read-reuse have been advanced. Consider the context where a shared cache is the first shared level of the memory hierarchy. Here, several techniques to improve simultaneous access would include multi-ported caches, synchronized broadcast, and cache privatization. Multi-ported caches are essentially a bite-the-bullet approach where the cache provides enough bandwidth to support all requesting cores. A naïve implementation requires many ports, thereby incurring an area and power penalty, or heavy sub-banking, with the disadvantage of address restrictions. Also, it only addresses the shared-memory bandwidth problem.

It is possible to use a synchronized broadcast of data and control, forcing a set of execution units to operate in a single instruction-stream, multiple data-stream (SIMD) or very long instruction word (VLIW) execution model. SIMD describes computers or integrated circuits with multiple processing elements that perform the same operation on multiple data points simultaneously. Such machines exploit data level parallelism, but not concurrency: there are simultaneous (parallel) computations, but only a single process (instruction) at a given moment. An integrated circuit with VLIW technology is capable of executing many operations within one clock cycle. Pursuant to the SIMD or VILW models, a single instruction would load the data in a synchronized manner for all cores, and use a custom data-delivery network for broadcasting data—thus solving all three problems mentioned above. The downside is that both of these execution models are very inflexible across more irregular algorithms and are thus very limiting in terms of the resulting parallelism structure. They are also inefficient when the input dataset size (e.g. width of a matrix which is being operated on) is less wide than vector width, and are therefore difficult to arbitrarily scale.

Yet another strategy is to associate each core with a large private cache that can hold a relevant working set of simultaneously read and reused items. The major penalty here is the extra area involved in replicating the caches. In addition, this strategy does not solve the problems of request bandwidth and data bandwidth to the shared level of the memory hierarchy. Thus, there exists a need to overcome at least one of the preceding deficiencies and limitations of the related art.

BRIEF DESCRIPTION OF THE EXEMPLARY EMBODIMENTS

The following summary is merely intended to be exemplary. The summary is not intended to limit the scope of the claims.

An exemplary embodiment of a method for acceleration of simultaneous access to shared data may include providing a plurality of groups of cores and a plurality of shared memory structures, providing a pod comprising the plurality of groups of cores linked by a common broadcast channel, and coordinating each shared memory structure to provide a logically unified memory structure. Each memory structure may be associated with a group of cores, and each group of cores may include one or more cores. The common broadcast channel may be operatively coupled to each shared memory structure. The coordinating each shared memory structure may include identifying a simultaneous read-reuse load to a first shared memory structure, fetching data corresponding to the simultaneous read-reuse load, and forwarding the data to shared memory structures other than the first shared memory structure and to groups of cores other than a first group of cores via the broadcast channel.

An exemplary embodiment of computer program product may include a non-transitory computer-readable storage medium having a computer-readable program stored therein. The computer-readable program, when executed on a computing device including at least one processor, may cause the at least one processor to perform providing a plurality of groups of cores and a plurality of shared memory structures, providing a pod comprising the plurality of groups of cores linked by a common broadcast channel, and coordinating each shared memory structure to provide a logically unified memory structure. Each memory structure may be associated with a group of cores, and each group of cores may include one or more cores. The common broadcast channel may be operatively coupled to each shared memory structure. The coordinating each shared memory structure may include identifying a simultaneous read-reuse load to a first shared memory structure, fetching data corresponding to the simultaneous read-reuse load, and forwarding the data to shared memory structures other than the first shared memory structure and to groups of cores other than a first group of cores via the broadcast channel.

An exemplary embodiment of an apparatus may include a processor; and a memory coupled to the processor. The memory may include instructions that, when executed by the processor, cause the processor to perform providing a plurality of groups of cores and a plurality of shared memory structures, providing a pod comprising the plurality of groups of cores linked by a common broadcast channel, and coordinating each shared memory structure to provide a logically unified memory structure. Each memory structure may be associated with a group of cores, and each group of cores may include one or more cores. The common broadcast channel may be operatively coupled to each shared memory structure. The coordinating each shared memory structure may include identifying a simultaneous read-reuse load to a first shared memory structure, fetching data corresponding to the simultaneous read-reuse load, and forwarding the data to shared memory structures other than the first shared memory structure and to groups of cores other than a first group of cores via the broadcast channel.

BRIEF DESCRIPTION OF THE DRAWINGS

A more particular description will be rendered by reference to exemplary embodiments that are illustrated in the accompanying figures Understanding that these drawings depict exemplary embodiments and do not limit the scope of this disclosure, the exemplary embodiments will be described and explained with additional specificity and detail through the use of the accompanying drawings in which.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to emphasize specific features relevant to some embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Figure 1:
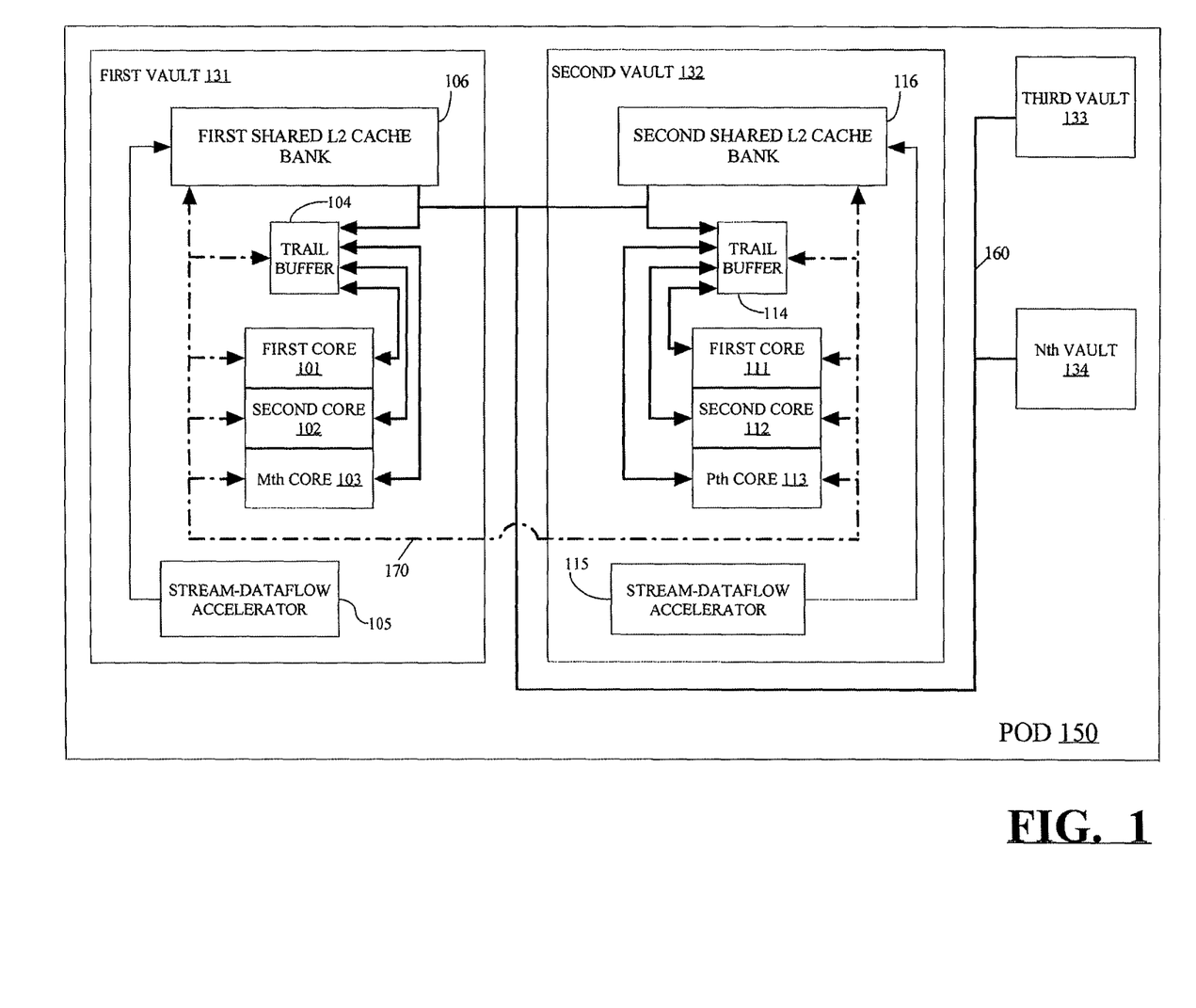
FIG. 1 illustrates an exemplary apparatus for performing L2 cache acceleration in accordance with one or more exemplary embodiments.

The description below describes an exemplary embodiment in which the first shared level of the memory hierarch is a shared cache, which is referred to as an L2 cache. A vault is a shared cache bank combined with one or more cores, which could have a private cache. FIG. 1 illustrates an exemplary apparatus for performing L2 cache acceleration in accordance with one or more exemplary embodiments. A first vault 131 includes a first shared L2 cache bank 106 operatively coupled to a first set of cores illustratively comprising a first core 101, a second core 102, and an Mth core 103, where M is a positive integer, including zero. According to a further embodiment, the first set of cores may include a total of one to eight cores. The first shared L2 cache bank 106 is operatively coupled to a stream-dataflow accelerator 105. The stream dataflow accelerator is a reconfigurable processor with high computation bandwidth. In other embodiments, such an accelerator could be replaced with designs (not limited to) a vector processor, GPU core, systolic array, a set of cores, or fixed-function computational hardware. Likewise, a second vault 132 includes a second shared L2 cache bank 116 operatively coupled to a second set of cores illustratively comprising a first core 111, a second core 112, and a Pth core 113, where P is a positive integer greater than two. According to a further embodiment, the second set of cores may include a total of one to eight cores. The second shared L2 cache bank 116 is operatively coupled to a stream-dataflow accelerator 115.

A pod 150 includes a set of two or more vaults, such as the first vault 131, the second vault 132, a third vault 133, and an Nth vault 134. The L2 caches of the individual vaults within the pod 150 are accessible across all of the vaults in the pod. Thus, the first shared L2 cache bank 106 is accessible from the first vault 131, the second vault 132, the third vault 133, and the Nth vault 134. Similarly, the second shared L2 cache bank 116 is also accessible from the first vault 131, the second vault 132, the third vault 133, and the Nth vault 134. For example, a narrow network-on-chip (NoC) bus 160 may be used to link the first shared L2 cache bank 106 of the first vault 131 with the second shared L2 cache bank 116 of the second vault 116, and also with corresponding shared L2 cache banks in the third vault 133 and the Nth vault 134. For purposes of illustration, the NoC bus 160 may utilize a 128-bit grid topology.

During an execution phase, the first, second, third, and Nth vaults 131, 132, 133 and 134 in the pod 150 are all executing the same computation. However, the first, second, third and Nth vaults 131, 132, 133, and 134 do not have to be explicitly synchronized on a cycle-by-cycle basis like a SIMD or VLIW machine. When a vault x of the first, second, third and Nth vaults 131, 132, 133, and 134 in the pod 150 accesses an address m, very soon all of the other vaults in the pod 150 will also access the same address. This behavior pattern is very common in deep-learning workloads for accessing weights during an inference (forward pass) process. Furthermore, the weights are read-only accesses. In this scenario, a logically unified L2 cache is provided among two or more of the vaults 131, 132, 133 and 134 in the pod 150.

The logically unified L2 cache includes the first shared L2 cache bank 106 and the second shared L2 cache bank 116. Pursuant to a further embodiment, a logically unified L2 cache is provided among all of the vaults 131, 132, 133 and 134 using the first shared L2 cache bank 106, the second shared L2 cache bank 116, a third shared L2 cache bank (not shown) in the third vault 133, and an Nth shared L2 cache bank (not shown) in the Nth vault 134, along with the NoC bus 160. By unifying a quantity v of vaults among the vaults 131, 132, 133 and 134, an effective bandwidth increase of a factor of v is achieved for the vaults in the pod 150, instead of having to duplicate the same data values in different vaults.

The logically unified L2 cache is designed to service v accesses every cycle, which with a naïve implementation requires v ports or heavy sub-banking (which introduces address restrictions). Instead, according to a set of embodiments described herein, an illusion of v cache ports is created by associating each core (and associated private storage) with a corresponding small trail buffer. For example, the first shared L2 cache bank 106 and/or a first group of cores 101, 102, 103 is associated with a trail buffer 104, and the second shared L2 cache bank 116 and/or a second group of cores 111, 112, 113 is associated with a trail buffer 114. Likewise, respective shared L2 cache banks (not shown) and a group of cores (not shown) in the third vault 133 and the Nth vault 134 would also each be equipped with a corresponding trail buffer. The trail buffers 104 and 114 (and corresponding trail buffers in the third vault 133 and the Nth vault 134) are linked to the shared L2 cache banks, including the first and second shared L2 cache banks 106 and 116 over a broadcast bus 170. According to a further embodiment, the trail buffers 104 and 114 are each configured for storing a number of entries within the approximate range of 4 to 64. According to a still further embodiment, the trail buffers 104 and 114 are each configured for storing 16 entries.

In response to a request for a read-reuse load for the cache line associated with address m from an L2 cache bank, the cache line (including the data and perhaps the address depending on the embodiment) is broadcast to all of the vaults 131, 132, 133 and 134 in the pod 150, and that line is then written into the trail buffer 104 and the trail buffer 114. Because of the high likelihood of contiguous access for read-reuse data, several contiguous lines may be transferred from the L2 to the trail buffers. This may be configured either per program phase or per access.

One implementation of the trail buffer 104 and the trail buffer 114 is to maintain each of these buffers as a FIFO ("first-in-first-out") with new entries being pushed on top of old entries, and if or when the FIFO is full, the oldest entry is overwritten. FIFO stands for first-in-first-out. Alternatively or additionally, other complex mechanisms, such as least recently used (LRU) can be used to implement replacement policies on the trail buffers 104 and 114.

Requests from the core, which are either misses in the private L1 cache or loads which are designated to bypass the l1 cache, will check the corresponding trail buffer, such as the trail buffer 104, to determine whether or not the address m is present in this secondary buffer. If the address m is present in the trail buffer 104, then the address m is consumed without sending the request out to one the L2 cache banks.

In the case where the L1 is not bypassed, there are several options for the ordering of trail-buffer and L1 access, as well as the policy of whether the trail-buffer data should be copied into L1. In some embodiments, whenever there is a hit in the trail-buffer, the data is copied into the L1; this would be beneficial if there is also temporal reuse on trail-buffer access. If it is known somehow whether the load has temporal locality, this can drive the decision of whether to cache a trail buffer hit in L 1. As for the access ordering, in some embodiments, the trail buffer and L1 cache could be accessed simultaneously to reduce access latency, and a hit would be forwarded by either structure. The negative consequence is extra energy to access both structures. Alternatively, one or the other structure may be accessed first. Accessing the trail buffer first can be a good approach, because of the high likelihood of hitting in the trail buffer if there is no temporal reuse. On the other hand, if there is temporal reuse, then it would be better to access the L1 first.

The pod 150 represents the granularity at which simultaneous read reuse is exploited. In this design, one does not exploit this form of reuse across an entire chip which may include a multiplicity of pods, due to the difficulty of achieving even decoupled synchronization among as many as thousands of different cores. Limiting decoupled broadcasting to the pod 150 allows one to reduce data duplication for read-reused data by v, where v is the number (quantity) of vaults per pod 150, without having to keep more than the number of v vaults synchronized.

Identification of broadcast loads proceeds as follows. In order to enable decoupled broadcast, the loads which exhibit the property of simultaneous read-reuse must be somehow identified to the shared L2 cache comprising at least the first shared L2 cache bank 106 and the second shared L2 cache bank 116. There are both programmer-exposed and microarchitecture level techniques for achieving this. Two static and two dynamic approaches are presented hereinafter.

Static-Load Identification: An instruction representing a command to read from memory is modified with an extra flag to indicate that this read is to be considered for decoupled broadcast. When the core performs an L2 access with respect to the first shared L2 cache bank 106 (if the trail buffer 104 misses, as will be explained subsequently), a bit indicating decoupled broadcast is forwarded as metadata with the instruction. This functionality can be exposed to the programmer through a special load intrinsic (similar to X86 SSE/SIMD programming), or the compiler can be responsible for automatically identifying these accesses. The load intrinsic may optionally specify whether there is temporal reuse, as well as the number of lines that should be transferred. If the L1 cache is bypassed, the above information regarding temporal reuse can be forwarded from the core at the time that it makes the request. If the L1 cache is not bypassed, this bit should be forwarded to the L1, and subsequently forwarded to the L2 cache on a miss. If this functionality is used incorrectly on a read which does not exhibit simultaneous reuse across most vaults in the pod 150, there can be strict negative performance consequences, as NoC bandwidth on the NoC bus 160 would be wasted for the broadcasts. Incorrectly using the broadcast instruction can have correctness implications, as will be discussed in greater detail hereinafter.

Static load identification is a simple approach with several advantages. First, it avoids any unnecessary traffic on the NoC bus 160 due to missed predictions. Second, data can easily be treated as simultaneous-read-reuse or not, dynamically at different phases of the program. Third, with regard to the chip containing the pod 150, streams which represent large patterns of memory access are either generated by a compiler, or programmed explicitly by a programmer. Thus, the overhead of reasoning about one additional aspect of a stream's execution should be extremely low.

Static-Region Identification: This approach slightly augments the previous approach with an additional level of abstraction for the programmer (and no hardware changes). Here, the memory regions of the program which correspond to typically-simultaneously-reused data is identified in the program using a keyword "broadcast," for example, "broadcast int array[100]." The compiler will then employ the appropriate load instructions based on the presence of this keyword. This may be used for memory which is semantically associated with a function (local memory in programming language terms), as otherwise the compiler would have to analyze the flow of data between functions (intraprocedural analysis). One advantage is less programmer effort, as one flag per memory region is used, instead of one flag per load. However, one disadvantage is flexibility, if sometimes the data has different access patterns in different program phases—i.e. if it in some phases not used by multiple cores simultaneously. In this latter case, performance degradation will occur because of aggressive broadcasting.

Dynamic Address-Based Matching: The loads which exhibit the desired property can also be identified dynamically. To perform this identification, the logically unified L2 cache maintains a "recency buffer" which stores the addresses of recently loaded data in a small direct-mapped (or low-way set-associative) cache structure. For example, the recency buffer could be provided at one or more of the first shared L2 cache bank 106 or the second shared L2 cache bank 116. Each time a load accesses the logically unified L2 cache, it also will access the recency buffer, and if a desired address is not stored among the addresses of recently loaded data, the cache will replace an existing entry. Each entry of the recency buffer also maintains a bitmask that indicates whether any core in the pod 150 has also accessed that data during the life of the entry. If the number of elements in the bitmask exceeds a threshold, then that address (and any nearby addresses, e.g., +/−4 cache lines) are considered to be for simultaneous-read-reused data. The logically unified L2 cache maintains a running addresses register (or a set of such registers) to indicate the current location(s) of the streaming-reuse, which is updated on broadcast. One advantage is a lack of programmer support required for exploiting the decoupled broadcast hardware. One disadvantage is the additional hardware required for tracking addresses in the recency buffer, the additional hardware in maintaining coherence in the trail buffer in case of a misprediction, and the additional NoC traffic overhead on a misprediction.

Dynamic Address-based Matching+PC Identification: A similar approach can effectively target a slightly different subset of programs. Pursuant to this approach, a first step is to send a program counter ("PC") along with any local L2 read requests to a shared L2 cache bank, such as the first shared L2 cache bank 106. Next, the logically unified L2 cache still maintains the recency buffer as described previously, but also the PC of the local request is stored in this table. Using a similar technique as before, when a read-reused load is identified, the local PC is marked as being the broadcast load. This PC will be stored in a handful of registers which, at the logically unified L2 cache, are checked at each memory load, similar to the running address registers in the previous approach.

If an incoming L2 access matches a broadcasting PC, then it is identified as a broadcast load. The advantage of this approach is that it can generalize to more strides easier, rather than being limited to contiguous data only. The disadvantage is the power/area or additional cycles to send the PC address with each L2 load request. This approach also limits the broadcast-trigger to only the local core's access (for example, the first core 101), which in practice is unlikely to cause performance penalties, as eventually the local core will start to lead the other cores after a short catch-up phase.

Each of the foregoing dynamic techniques have an additional slight disadvantage over the static techniques in that these dynamic techniques require some sample loads before detecting the appropriate patterns. This is not a significant concern if the length of a program phase is large.

Decoupled Broadcast Hardware:

Broadcast Network: Within the logically unified L2 cache, after a load which has been identified as a decoupled-broadcast has completed fetching its data, the logically unified L2 cache will be instructed to also forward the data to the other vaults in the pod 150, for storage in their corresponding trail buffers. While the NoC bus 160 could be reused for this purpose, the bandwidth of the general-purpose NoC bus 160 may need to be limited because of physical design considerations. Instead, the broadcast bus 170 may be added specifically for simultaneous read re-use. Thus, a shared L2 cache bank, such as the first shared L2 cache bank 106, will access the broadcast bus 170 to share weights with other vaults in the pod 150, such as the second, third, and Nth vaults 132, 133 and 134. A simple bus is sufficient for implementing the broadcast bus 170, as one would expect only one shared L2 cache bank per pod 150 (such as the first shared L2 cache bank 106) to be serving reused values to the other vaults (such as the second, third, and Nth vaults 132, 133, and 134 at any given time (since banks are address-partitioned at a coarse grain). Physically, the broadcast bus 170 may be implemented as a bus or ring network.

Trail Buffer: The trail buffers 104 and 114 may each be implemented as a logical FIFO for decoupling broadcast accesses of simultaneously read-reused values from their consumption. Since typical workloads only exhibit one stream of data in this way, the trail buffers 104 and 114 can be designed to only support (or only be optimized for) accessing one stream. One implementation of the trail buffers 104 and 114, which we assume here, is to maintain each of these buffers as FIFO with new entries being pushed on top of the old entries, and when the FIFO is full, the oldest entry is overwritten. The advantage of this design is the lack of a need to use full tag access checks and perform row-decoding on a standard cache. Instead, the trail buffer just maintains the current address for the oldest entry and the number of entries—this range of values may be used for satisfying coherence requests.

An alternate design for the trail buffers 104 and 114 employs a cache with least-recently-used (LRU) replacement. This enables the ability to support more streams, and also takes advantage of data that fits completely in the trail buffer 104 or 114, which would reduce pressure on the first shared L2 cache bank 106 or the second shared L2 cache bank 116, respectively, even more. However, this situation may be rare for the reuse distances typical of the weights in the implementations described herein, which is why the previously-described FIFO-like structure may be a more commonplace implementation.

Another alternative to the above is to simply elide the trail buffer structure, and store the read-reuse data in a level of the private cache. This would pollute this cache with broadcast data (only problematic if there is no reuse), and make it more difficult to determine synchronization, but would decrease complexity. A slight variation on this alternative, which can reduce the harmful effects of cache pollution, is to use a dedicated "way" of the cache (this terminology is standard for set-associative caches) to store broadcast data. By limiting data to one way, the other ways are not polluted.

Trail Buffer Coherence: One additional consideration of the trail buffers 104 and 114, as mentioned previously in connection with broadcast load identification, is whether or not the trail buffer 104, 114 is considered to be part of a coherence domain. For example, if a store reaches the logically unified L2 cache for an address which has recently been broadcast to several trail buffers including the trail buffers 104 and 114, the logically unified L2 cache should somehow invalidate the entries in one or more of the trail buffers 104 and 114, in order for these buffers to be considered part of the coherence domain. For designs which use programmer/compiler broadcast-load identification, this step is unnecessary, as the programmer or compiler will guarantee that only loads which are truly broadcast loads will be identified, so no writes will occur with respect to this data.

For dynamic hardware detection, the trail buffers 104 and 114 should be considered part of the coherence domain; i.e. any local or remote core modifications to addresses which the trail buffer maintains should be reflected in the trail buffer. In an exemplary embodiment, data which is designated as read-reuse will also be guaranteed by the compiler not to alias with any other concurrent writes—in such a scenario no further hardware is required.

Optimizations for Synchronization: Performance loss can occur when cores (such as the first core 101, the second core 102, and the Mth core 103 of the first vault 131, and the first core 111, second core 112, and Pth core 113 of the second vault 132) become too synchronized or desynchronized. Any of two optimizations may be utilized to avoid these situations, as follows.

Scenario1—Too Synchronized: One scenario which should be avoided is repeated simultaneous requests for the same addresses at a particular shared L2 cache bank, such as the first shared L2 cache bank 106, which could happen if all of the vaults in the pod 150, such as the first, second, third and Nth vaults 131, 132, 133 and 134 are too synchronized. If multiple requests to the same shared L2 cache bank (for example, the first shared L2 cache bank 106) are in-flight at the same time, and are not satisfied by the trail buffer 104, the logically unified L2 cache has no chance to broadcast the value. So not only is the benefit of using the trail buffer 104 cancelled, but there will also potentially be extra bandwidth consumed by the logically unified L2 cache for forwarding useless data to the trail buffers 104 and 114.

To avoid multiple broadcasts, the first shared L2 cache bank 106 keeps the last d addresses serviced by a broadcast load, in a structure called a recent broadcast table (RBT). The RBT is a circular buffer, providing associative lookup, that records the last d broadcast addresses. If a broadcast load hits in the RBT, it is not broadcast. The request is redirected to the local trail buffer of the respective core, such as the trail buffer 104 of the first core 101. Alternatively, a request that hits in RBT may access the L2 cache bank and return the data instead of forwarding the request. This takes additional bandwidth but can be simpler.

Scenario 2—Desynchronized: An undesirable scenario is when one vault, such as the first vault 131, is so slow that it does not use the data on the trail buffer 104 before this trail buffer is overwritten. This will certainly cause redundant broadcasts at the logically unified L2 cache, and make it even more likely that other cores (such as the second core 102 and the Mth core 103 of the first vault 131, as well as the first core 111, the second core 112, and the Pth core 113 of the second vault 132) fall behind due to excess useless data in their trail buffers 104 and 114, respectively. To avoid this, the trail buffers 104 and 114 are configured to keep a bit associated with each line indicating whether they were used. If the total number of unused lines in the trail buffer 104 or 114 which have valid data in them become too large, that means a corresponding vault, such as the first vault 131 or the second vault 132, respectively, is about to become desynchronized. The corresponding vault then immediately warns the respective shared L2 cache bank, such as the first shared L2 cache bank 106 or the second shared L2 cache bank 116, to introduce a short delay. This is a one-time delay, so if the data is never consumed, normal execution can continue.

Another approach to reducing desynchronization overhead is to have the RBT count the number of cores that have requested a line, and only broadcast if several requests are received for the same line within some time window. The overhead of waiting would not be on the critical path if multiple lines are broadcast in sequence for a single read-reuse request, as was described previously.

Alternative Embodiments for Different Forms of Sharing

In another embodiment, there may only exist private caches and no shared caches. Instead, main memory may be the first shared level of the memory hierarchy. In such a design, there would be one RBT per memory controller (a memory controller is the state machine which performs main memory requests). The design operates in the same way as the one for shared caches, except that the data is broadcast from the memory controllers instead of shared cache banks.

Design Constraints and Performance Model:

Design Constraints: The broadcast bus 170 bandwidth should be chosen to match the desired consumption rate of associated values at the vaults 131, 132, 133 and 134. For example, for neural network style workloads, the broadcast bus 170 should be set equal to a scratchpad bandwidth from which one or more neurons in a neural network are reused. With respect to the size of each of the trail buffers 104 and 114, use of a larger trail buffer is beneficial. It is also helpful to not require tight synchronization if there are unexpected delays at any of the vaults 131, 132, 133 and 134 (for example, a control core, such as the first core 101, is overwhelmed on occasion and cannot issue fast enough).

Likewise, when transitioning between reading data from one shared L2 cache bank to another, such as transitioning from the first shared L2 cache bank 106 to the second shared L2 cache bank 116, it may take some cycles for the respective shared L2 cache bank 106 or 116 to redirect requests that occurred simultaneously back to the corresponding trail buffer 104 or 114 (due to the topology of the network). Assuming that tight synchronization is not a big issue, and assuming the worst case for transitioning between shared L2 cache banks, the size of each of the trail buffers 104 and 114 needs to be larger than the round trip time for a request that eventually gets re-routed to the trail buffer 104 or 114, minus the latency for the broadcast data to reach the trail buffer 104 or 114, where this whole latency was multiplied by the broadcast network bandwidth on the broadcast bus 170 per cycle.

The size of the RBT (recent broadcast table) at the first and second shared L2 cache banks 106 and 116 should be chosen to represent data that is still guaranteed to be in the corresponding trail buffer 104 or 114. Assuming the desynchronization avoidance technique described previously, setting the RBT size to the size of the trail buffers 104 and 114 represents a viable approach.

Performance Model: Consider the following parameters:

Bbw—Broadcast bus 170 bandwidth in bytes/cycle (per link);

Nbw—NoC bus 160 bandwidth in bytes/cycle per link;

Cbw—Logically Unified L2 Cache read bandwidth in bytes/cycle;

Vbw—Max consumption rate of the broadcast value at each vault 131, 132, 133, and 134, due to other constraints of the vault (scratchpad width for neurons, or computations/cycle of compute units, etc.);

Nvaults—number of vaults in the Pod 150;

O—old overall bandwidth (bytes/cycle consumed overall);

N—new overall bandwidth (bytes/cycle consumed overall);

Assumptions: (1) no other requests on the NoC bus 160; (2) for the non-optimized design, one may assume the NoC bus 160 is a crossbar in terms of bandwidth delivery capability. (Note: This model can be changed to reduce expected bandwidth to multiple cores for more realism, such as Nbw*4 rather than Nbw*Nvaults as assumed below, this would just improve the expected performance of the techniques described herein); (3) effects of establishing leader are rare enough not to cause performance glitches; and (4) no other latency non-determinism.

Speedup Model—limited by cache bandwidth, network bandwidth, and vault consumption bandwidth:

$O$=min(Cbw, Nbw*NVaults, Vbw);

$N$=min(Cbw*NVaults, Bbw*NVaults, Vbw*NVaults); and

Speedup=$N/O$.

According to a further embodiment, the pod 150 includes eight vaults and is configured as all or a portion of an integrated circuit chip. For purposes of illustration, the chip may include one or more pods. Each vault includes a corresponding 64-KB shared L2 cache bank and a corresponding trail buffer. For example, and with continuing reference to FIG. 1, the first vault 131 includes the first shared L2 cache bank 106 which is a 64-KB cache. Likewise, the second vault 132 includes the second shared L2 cache bank 116 which is another 64-KB cache. A 128-byte cache line size may be employed for each of the 64-KB caches. Each of the trail buffers, including the trail buffer 104 and the trail buffer 114, may be configured as an 8-entry buffer having a storage capacity of 1 KB, where each entry is one cache line. Accordingly, the total storage capacity in the pod 150 is (8*64 KB)+(8*1 KB)=520 KB.

If all remote accesses to a vault (such as the first vault 131) hit in the trail buffer (such as the trail buffer 104), a 512 KB 8-ported L2 cache is effectively provided for each of eight vaults, and supporting a bandwidth of 1024 bytes per cycle (8 cache lines per cycle). This structure provides a multi-ported cache for access without area and power overheads, while keeping a flexible execution model.

If there are no hits in the trail buffer 104 or 114, this causes serialization to the remote L2 cache. Since one would expect the data to be strided and one vault will have hot data at any point in time, this becomes a serialization bottleneck providing an effective bandwidth of only 128 bytes per cycle (1 cache line per cycle). A naïve solution to avoid this hotspot and obtain high bandwidth with a simple design is to simply duplicate the data across all of the vaults, which of course requires a much larger L2 cache size.

In order to achieve good hit rates in the trail buffers 104 and 114, the following workload behavior may be assumed: (a) read-only data; and (b) when a core, such as the first core 101, accesses something in an L2 cache, such as the first shared L2 cache bank 106, all other cores (including the second core 102 and the Mth core 103 of the first vault 131, as well as the first core 111, the second core 112, and the Pth core 113 of the second vault 132) also access that data very soon. For a trail buffer of size n, all other cores access that data before (n−1) accesses of the first core 101. Performing such a loosely-organized execution overcomes many of the drawbacks of very-wide SIMD or very-wide VLIW execution, and also overcomes the drawbacks of constructing implementation-specific hardware.

To obtain an overall performance improvement, assume that a broadcast bus bandwidth is 128 bytes/cycle, a network-on-chip (NoC) bandwidth is 16 bytes/cycle, and a vault consumption rate is also 128 bytes/cycle. Then, using the variables discussed previously:

$O$=min(128, 16*8, 128)=128;

$N$=min(128*8, 128*8, 128*8)=1024; and

Speedup=$N/O$=1024/64=8× speedup

Figure 2A:
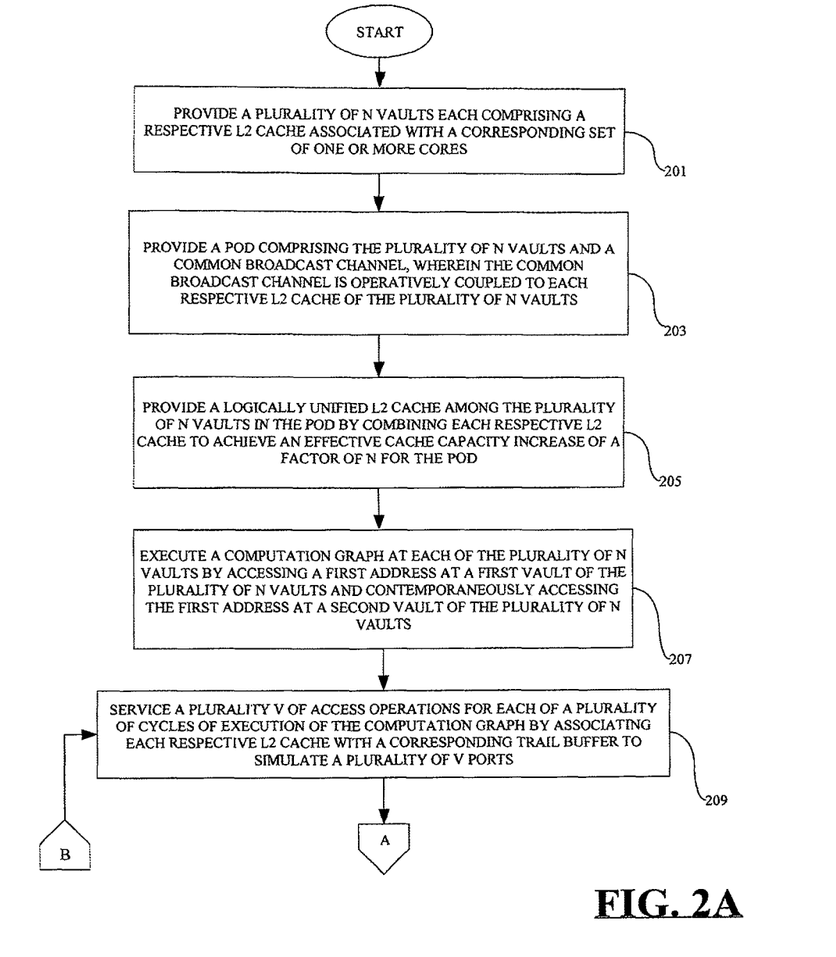
FIGS. 2A and 2B illustrate an exemplary method for performing L2 cache acceleration in accordance with the disclosure.
Figure 2B:
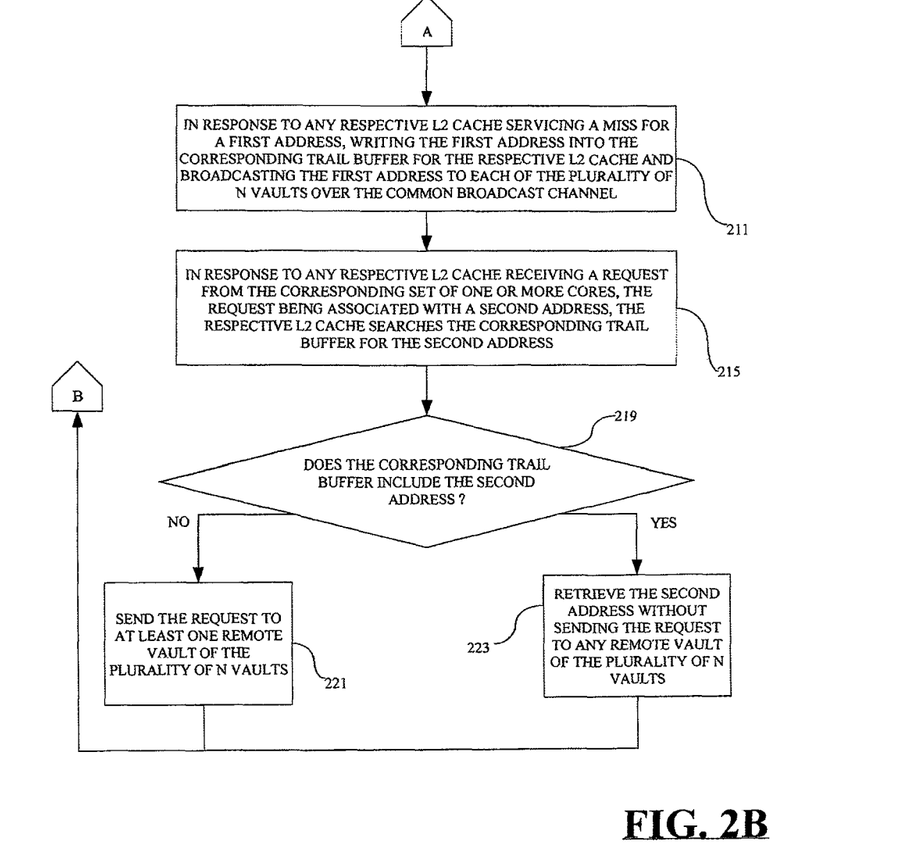

FIGS. 2A and 2B illustrate an exemplary method for performing L2 cache acceleration in accordance with one or more exemplary embodiments. The operational sequence commences at block 201 (FIG. 2A) where a plurality of N vaults (FIG. 1, first vault 131, second vault 132, third vault 133, and Nth vault 134) are provided, each comprising a respective L2 cache (the first shared L2 cache bank 106 for the first vault 131, the second shared L2 cache bank 116 for the second vault 132, a corresponding shared L2 cache bank (not shown) for the third vault 133, and a corresponding shared L2 cache bank (not shown) for the Nth vault 134). N is a positive integer greater than one.

Each respective L2 cache is associated with a corresponding set of one or more cores (the first core 101, the second core 102, and the Mth core 103 for the first shared L2 cache bank 106; and the first core 111, the second core 112, and the Pth core 113 for the second shared L2 cache bank 116. The third vault 133 and the Nth vault 134 each include a shared L2 cache bank and a set of cores which are not shown).

The operational sequence progresses to block 203 (FIG. 2A) where a pod 150 (FIG. 1) is provided comprising the plurality of N vaults (the first vault 131, the second vault 132, the third vault 133, and the Nth vault 134) and a common broadcast channel (the broadcast bus 170). The common broadcast channel is operatively coupled to each respective L2 cache (the first and second shared L2 cache banks 106 and 116, and the shared L2 cache banks (not shown) of the third vault 133 and the Nth vault 134) of the plurality of N vaults.

Next, at block 205 (FIG. 2A), a logically unified L2 cache is provided among the plurality of N vaults in the pod 150 (FIG. 1) by unifying each respective L2 cache to achieve an effective bandwidth increase of a factor of N for the pod 150. Then, at block 207 (FIG. 2A), a computation graph or program is executed at each of the plurality of N vaults 131, 132, 133 and 134 (FIG. 1) by accessing a first address at the first vault 131 of the plurality of N vaults and contemporaneously accessing the first address at the second vault 132 of the plurality of N vaults.

The operational sequence progresses to block 209 (FIG. 2A) where a plurality V of access operations are serviced for each of a plurality of cycles of execution of the computation by associating each respective L2 cache (such as the first shared L2 cache bank 106, FIG. 1) with a corresponding trail buffer (trail buffer 104) to simulate a plurality of V ports. Then, at block 211 (FIG. 2B), in response to any respective L2 cache servicing a miss for a first address, the first address is written into the corresponding trail buffer for the respective L2 cache, and the first address is broadcast to each of the plurality of N vaults over the common broadcast channel (the broadcast bus 170, FIG. 1).

Next, at block 215 (FIG. 2B), in response to any respective L2 cache receiving a request from the corresponding set of one or more cores, the request being associated with a second address, the respective L2 cache searches the corresponding trail buffer for the second address. Then, at block 219, a test is performed to ascertain whether or not the corresponding trail buffer includes the second address. If so, the second address is retrieved from the corresponding trail buffer without sending the request to any remote vault of the plurality of vaults (block 223), and the program loops back to block 209 (FIG. 2A). The negative branch from block 219 leads to block 221 where the request is sent to at least one remote vault of the plurality of N vaults, and the program loops back to block 209 (FIG. 2A).

Figure 3:
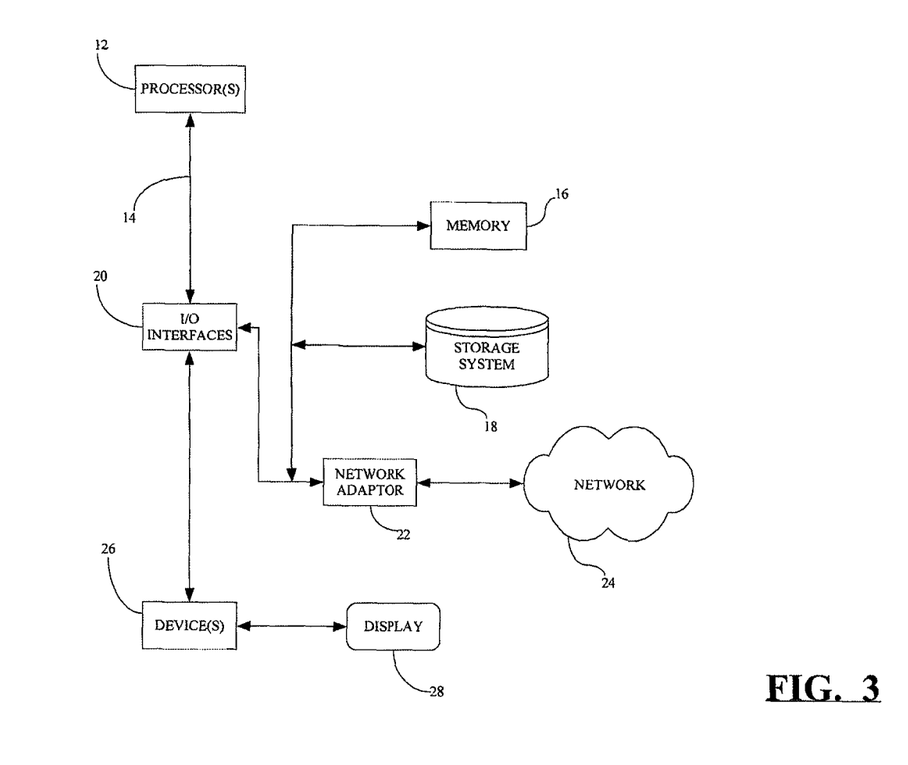
FIG. 3 illustrates a schematic of an exemplary computer or processing system that may implement any of the methods of FIGS. 2A and 2B, in accordance with one or more exemplary embodiments.

FIG. 3 illustrates a schematic of an exemplary computer or processing system that may implement any of the methods of FIGS. 2A and 2B, in one set of embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module that performs the methods described herein. The module may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. The computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The exemplary embodiments described herein may be practiced in the context of a system, a method, and/or a computer program product. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the accompanying figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the corresponding figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the exemplary embodiments has been presented for purposes of illustration and description but is not intended to be exhaustive or limited to the embodiments in the form disclosed. Many modifications and variations will be apparent to those of ordinary skill in the art without departing from the scope and spirit of the invention.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A method for performing acceleration of simultaneous access to shared data, the method comprising:
    providing a plurality of vaults, each vault of the plurality of vaults comprising a shared memory structure and a plurality of cores;
    operably coupling the plurality of vaults to form a pod;
    providing a common broadcast channel operably coupled to each vault within the pod;
    receiving a first request for first data from a first core of the plurality of cores within a first vault of the plurality of vaults;
    determining whether the first request is a simultaneous read-reuse load;
    in response to a determination that the first request is a simultaneous read-reuse load, performing:
        fetching the first data for use by the first core; and
        forwarding the first data to vaults other than the first vault via the broadcast channel.

2. The method of claim 1, wherein:
    each vault of the plurality of vaults further comprises a trail buffer;
    within each vault of the plurality of vaults, the shared memory structure, the trail buffer, and the plurality of cores are operably coupled to the broadcast channel; and
    the forwarding the first data comprises writing the first data to the trail buffer of each vault of the plurality of vaults other than the first vault.

3. The method of claim 2, further comprising:
    receiving a second request for the first data from a second core different from the first core;
    determining whether the first data is included in the trail buffer of the vault in which the second core is included;
    in response to a determination that the first data being included in the trail buffer, retrieving the first data from the trail buffer for use by the second core.

4. The method of claim 3, further comprising:
    in response to a determination that the trail buffer does not include the first data, sending the second request to at least one shared memory structure.

5. The method of claim 1, wherein:
    each core of the plurality of cores of each vault is associated with a private cache;
    within each vault of the plurality of vaults, the shared memory structure and the plurality of cores are operably coupled to the broadcast channel; and
    the forwarding the first data comprises writing the first data to the private cache of each core within the pod other than the first core.

6. The method of claim 1, wherein each shared memory structure is a partition of a shared cache.

7. A computer program product comprising a non-transitory computer-readable storage medium having a computer-readable program stored therein, wherein the computer-readable program, when executed on a computing device comprising a plurality of vaults each comprising a shared memory structure and a plurality of cores, the vaults being operably coupled together in a pod, and a common broadcast channel being operably coupled to each vault, causes the computing device to perform:

receiving a first request for first data from a first core of the plurality of cores within a first vault of the plurality of vaults;

determining whether the first request is a simultaneous read-reuse load;

in response to a determination that the first request is a simultaneous read-reuse load, performing:
  fetching the first data for use by the first core; and
  forwarding the first data to vaults other than the first vault via the broadcast channel.

8. The computer program product of claim 7, wherein:
each vault of the plurality of vaults further comprises a trail buffer;
within each vault of the plurality of vaults, the shared memory structure, the trail buffer, and the plurality of cores are operably coupled to the broadcast channel; and
the forwarding the first data comprises writing the first data to the trail buffer of each vault of the plurality of vaults other than the first vault.

9. The computer program product of claim 8, further causing the computing device to perform:
receiving a second request for the first data from a second core different from the first core;
determining whether the first data is included in the trail buffer of the vault in which the second core is included;
in response to a determination that the first data being included in the trail buffer, retrieving the first data from the trail buffer for use by the second core.

10. The computer program product of claim 9, further causing the computing device to perform, in response to a determination that the trail buffer does not include the first data, sending the second request to at least one shared memory structure.

11. The computer program product of claim 7, wherein:
each core of the plurality of cores of each vault is associated with a private cache;
within each vault of the plurality of vaults, the shared memory structure and the plurality of cores are operably coupled to the broadcast channel; and
the forwarding the first data comprises writing the first data to the private cache of each core within the pod other than the first core.

12. The computer program product of claim 7, wherein each shared memory structure is a partition of a shared cache.

13. An apparatus for performing acceleration of simultaneous access to shared data, the apparatus comprising:
a plurality of vaults operably coupled together to form a pod, each vault of the plurality of vaults comprising a shared memory structure and a plurality of cores; and
a common broadcast channel operably coupled to each vault within the pod, wherein
the shared memory structure of each vault collectively form a logically unified memory structure;
a first core of the plurality of cores within a first vault of the plurality of vaults is configured to generate a first request for first data and send the first request to the logically unified memory structure;
the logically unified memory structure is configured to determine whether the first request is a simultaneous read-reuse load;
the logically unified memory structure is configured to, in response to a determination that the first request is a simultaneous read-reuse load:
  fetch the first data for use by the first core; and
  forward the first data to vaults other than the first vault via the broadcast channel.

14. The apparatus of claim 13, wherein:
each vault of the plurality of vaults further comprises a trail buffer;
within each vault of the plurality of vaults, the shared memory structure, the trail buffer, and the plurality of cores are operably coupled to the broadcast channel; and
each trail buffer is configured to store the first data forwarded from the logically unified memory structure.

15. The apparatus of claim 13, wherein:
each core of the plurality of cores of each vault is associated with a private cache;
within each vault of the plurality of vaults, the shared memory structure, and the plurality of cores are operably coupled to the broadcast channel; and
each private cache is configured to store the first data forwarded from the logically unified memory structure.

16. The apparatus of claim 15, wherein:
a second core different from the first core is configured to generate a second request for the first data; and
the second core is configured to, in response to the first data being stored in the trail buffer of the vault in which the second core is included, retrieve the first data from the trail buffer.

17. The apparatus of claim 16, wherein the second core is configured to, in response to the first data not being stored in the trail buffer of the vault in which the second core is included, send the second request to the logically unified memory structure.

18. The apparatus of claim 17, wherein the logically unified memory structure is a shared cache, and each shared memory structure is a partition of the shared cache.

* * * * *